United States Patent
Kato

(10) Patent No.: US 12,104,074 B2
(45) Date of Patent: Oct. 1, 2024

(54) PRECOATED ALUMINUM MATERIAL AND ALUMINUM COMPOSITE MATERIAL

(71) Applicant: UACJ Corporation, Tokyo (JP)

(72) Inventor: Osamu Kato, Tokyo (JP)

(73) Assignee: UACJ Corporation, Tokyo (JP)

( * ) Notice: Subject to any disclaimer, the term of this patent is extended or adjusted under 35 U.S.C. 154(b) by 878 days.

(21) Appl. No.: 17/274,360

(22) PCT Filed: Sep. 10, 2019

(86) PCT No.: PCT/JP2019/035486
§ 371 (c)(1),
(2) Date: Mar. 8, 2021

(87) PCT Pub. No.: WO2020/054697
PCT Pub. Date: Mar. 19, 2020

(65) Prior Publication Data
US 2021/0324225 A1    Oct. 21, 2021

(30) Foreign Application Priority Data
Sep. 10, 2018 (JP) .................. 2018-169025

(51) Int. Cl.
*C09D 153/02* (2006.01)
*C09D 167/03* (2006.01)
(Continued)

(52) U.S. Cl.
CPC ......... *C09D 153/02* (2013.01); *C09D 167/03* (2013.01); *C09D 177/00* (2013.01); *C09D 181/04* (2013.01); *C09J 175/06* (2013.01)

(58) Field of Classification Search
None
See application file for complete search history.

(56) References Cited

U.S. PATENT DOCUMENTS 4,562,714 A * 1/1986 Tanaka ............... C09D 5/08
72/46
4,880,890 A    11/1989 Miyabayashi et al.
(Continued)

FOREIGN PATENT DOCUMENTS

CN    101952343 A    1/2011
EP    2788447 B1    9/2015
(Continued)

OTHER PUBLICATIONS

Morikawa—WO 2016-152117 A1—sis IDS—MT—polyurethane+acrylic resin—amounts—2016 (Year: 2016).*
(Continued)

*Primary Examiner* — John Vincent Lawler
(74) *Attorney, Agent, or Firm* — J-TEK LAW PLLC; Jeffrey D. Tekanic; Scott T. Wakeman

(57) ABSTRACT

A precoated aluminum material to which various resin members can be bonded and an aluminum composite material that is prepared using this precoated aluminum material are provided. A precoated aluminum material (1) comprises: a substrate (2) composed of an aluminum material; and a primer coating (3) formed on the substrate (2). The primer coating (3) contains urethane resin. In the infrared-absorption spectrum of the primer coating (3), the value of the optical absorption $A_{C=O}$ at the peak top of the maximum peak among peaks present in the wavenumber range of 1,180-1,330 $cm^{-1}$ is 0.8-1.5 times that of the optical absorption $A_{urethane}$ at the peak top of the maximum peak among peaks present in the wavenumber range of 1,670-1,770 $cm^{-1}$.

15 Claims, 2 Drawing Sheets

(51) Int. Cl.
*C09D 177/00* (2006.01)
*C09D 181/04* (2006.01)
*C09J 175/06* (2006.01)

(56) References Cited

U.S. PATENT DOCUMENTS

| | | | | |
|---|---|---|---|---|
| 5,314,945 A | * | 5/1994 | Nickle | ............... C09D 133/066 |
| | | | | 525/218 |
| 2009/0182084 A1 | | 7/2009 | Ding et al. | |
| 2015/0239222 A1 | | 8/2015 | Meyer et al. | |
| 2017/0205159 A1 | | 7/2017 | Yamashita et al. | |
| 2017/0355887 A1 | | 12/2017 | Schumacher et al. | |
| 2019/0036086 A1 | | 1/2019 | Ueda et al. | |

FOREIGN PATENT DOCUMENTS

| | | |
|---|---|---|
| GB | 2205321 A | 12/1988 |
| JP | 2010111111 A | 5/2010 |
| JP | 2014198869 A | 10/2014 |
| JP | 2015507643 A | 3/2015 |
| JP | 2018028141 A | 2/2018 |
| TW | 201637853 A | 11/2016 |
| WO | 2011118027 A1 | 9/2011 |
| WO | WO-2016152117 A1 * 9/2016 ............. B29C 33/12 |
| WO | 2017142071 A1 | 8/2017 |

OTHER PUBLICATIONS

Office Action from the Chinese Patent Office dispatched Nov. 1, 2022 in related Chinese application No. 201980042639.7, and translation thereof.

Notice of Allowance from the Japanese Patent Office dispatched Nov. 29, 2022 in related Japanese Patent Application No. 2018-169025, and English translation thereof.

International search report from parent application No. PCT/JP2019/035486 dispatched Oct. 8, 2019.

Office Action from the Japanese Patent Office dispatched Jun. 7, 2022 in related Japanese Patent Application No. 2018-169025, and English translation thereof.

* cited by examiner

PRECOATED ALUMINUM MATERIAL AND ALUMINUM COMPOSITE MATERIAL

CROSS-REFERENCE

This application is the US national stage of International Patent Application No. PCT/JP2019/035486 filed on Sep. 10, 2019, which claims priority to Japanese Patent Application No. 2018-169025 filed on Sep. 10, 2018.

TECHNICAL FIELD

The present invention relates to a precoated aluminum material and to an aluminum composite material.

BACKGROUND ART

Aluminum materials (including aluminum and aluminum alloys; likewise below) have, as metals, a high strength-to-weight ratio and therefore are used in various applications such as casings of electronic parts and the like, interior and exterior parts of vehicles and the like, mechanical parts, structural materials, etc. In addition, depending on the application, for example, an aluminum composite material comprising an aluminum material and a resin member composed of a resin whose specific gravity is lighter than that of the aluminum material is used for the purpose of weight reduction and the like. As the method of attaching the resin member to the aluminum material, methods such as a method that fastens the two together via a fastening member such as a bolt and a method that mechanically couples the two together by crimping or the like are often used.

However, when attaching the resin member, these methods require the performance of work that tightens the two together using a fastening member, work that crimps the resin member to the aluminum material, or the like, and this attaching work tends to become complicated. Accordingly, there is a demand for a simpler method of attaching the resin member to the aluminum material.

As a method of bonding a metal member and a resin member, a method is known in which a primer coating is provided on the metal member, and the metal member and the resin member are bonded via the primer coating. For example, in the situation in which an attempt is made to bond a resin member to a steel sheet, which serves as the metal member, a technique has been proposed (Patent Document 1) in which a chemical-conversion coating, which contains colloidal silica, a silane coupling agent, an acid, and a resin component, and an adhesive precoated layer, which contains a thermoplastic resin, are provided on the steel sheet. The resin member is bonded to the adhesive precoated coating by a method such as, for example, injection molding, hot pressing, or the like.

PRIOR ART LITERATURE

Patent Documents

Patent Document 1

Japanese Laid-open Patent Publication 2018-28141

SUMMARY OF THE INVENTION

In a situation in which an aluminum material is used as the metal member, the current state of affairs is that an effective primer for various resins is yet to be put into practical use. For example, because resins such as polybutylene terephthalate (PBT), polyamide (PA), polyphenylene sulfide (PPS), acrylonitrile-butadiene-styrene copolymer (ABS), and the like have wide application, there is demand to bond such resins to an aluminum material using a primer. However, there is a problem in that, with regard to previously existing primers for aluminum materials, the bonding strength between these resins and aluminum materials is low.

The present invention was conceived considering this background, and an object of the present invention is to provide a precoated aluminum material to which a variety of resin members can be bonded and an aluminum composite material that is prepared using this precoated aluminum material.

One aspect of the present invention is a precoated aluminum material, to which a resin member is bondable, comprising:

a substrate composed of an aluminum material; and
a primer coating formed on the substrate;
wherein:
the primer coating:
contains urethane resin; and
has an infrared-absorption spectrum in which the value of the optical absorption $A_{C=O}$ at the peak top of the maximum peak among peaks present in the wavenumber range of 1,180-1,330 $cm^{-1}$ is 0.8-1.5 times that of the optical absorption $A_{urethane}$ at the peak top of the maximum peak among peaks present in the wavenumber range of 1,670-1,770 $cm^{-1}$.

Another aspect of the present invention is an aluminum composite material comprising:

the precoated aluminum material according to the above-mentioned aspect; and
a resin member, which contains one or two or more from among polybutylene terephthalate, polyamide, polyphenylene sulfide, and acrylonitrile-butadiene-styrene copolymer and is bonded to the primer coating of the precoated aluminum material.

The precoated aluminum material comprises a primer coating, which contains urethane resin and has an infrared-absorption spectrum in which the value of the optical absorption $A_{C=O}$ is 0.8-1.5 times the value of the optical absorption $A_{urethane}$, on a substrate. By providing the above-mentioned specific primer coating on an aluminum material, which serves as a substrate, it is possible to improve adhesion with a variety of resins such as, for example, polybutylene terephthalate (PBT), polyamide (PA), polyphenylene sulfide (PPS), and acrylonitrile-butadiene-styrene copolymer (ABS).

Consequently, according to the above-mentioned precoated aluminum material, a resin member, which is composed of a variety of resins, can be securely bonded.

DETAILED DESCRIPTION

Figure 1:
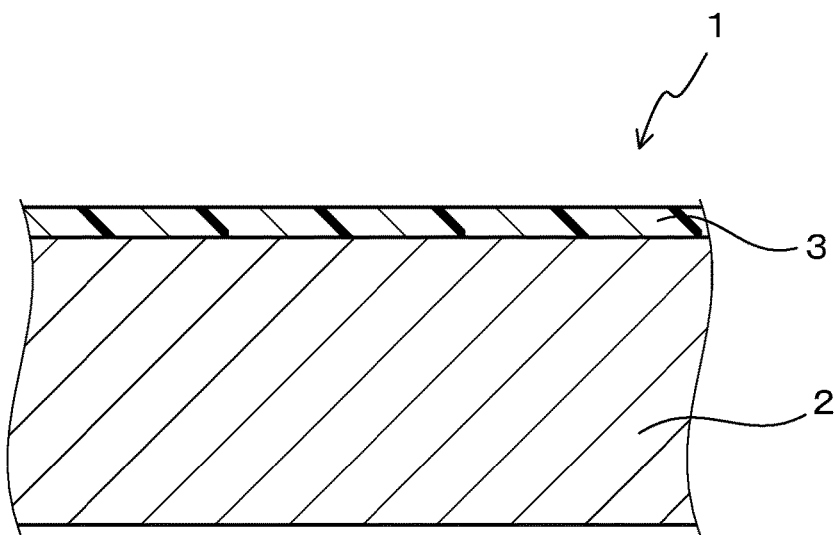
FIG. 1 is a partial, cross-sectional, enlarged view that shows the principal parts of a precoated aluminum material according to a working example.

In the above-mentioned precoated aluminum material, the material properties and the grade of the aluminum material that constitutes the substrate are not particularly limited. Aluminum or an aluminum alloy having the desired characteristics in accordance with the application of the aluminum-alloy composite material after a resin member has been bonded to the aluminum or the aluminum alloy can be used as the substrate.

For example, in a situation in which the aluminum-alloy composite material is to be used in an application such as a mechanical part, A1000-series aluminum (pure aluminum), A2000-series alloy, A3000-series alloy, A5000-series alloy, A6000-series alloy, A7000-series alloy, or the like can be used as the aluminum material that constitutes the substrate.

In addition, in a situation in which a metal part, which is obtained by forming a sheet as in a body panel of an automobile, is to be substituted with an aluminum composite material, A5000-series alloy, which has good formability, A6000-series alloy, which has good bake hardenability, that is, it has a property such that its strength increases when hardened by heating, such as by paint-baking, or the like can be used as the aluminum material that constitutes the substrate. In a situation in which a rod-shaped metal part, such as a door beam, a bumper beam, instrument-panel reinforcement, or the like of an automobile is to be substituted with an aluminum-alloy composite material, A6000-series alloy, which excels in extrudability, A7000-series alloy, which is advantageous for its high strength and for lightening, or the like can be used as the aluminum material that constitutes the substrate.

In a situation in which the aluminum composite material is to be used in a component for a heat exchanger or the like, A1000-series aluminum, which excels in corrosion resistance and thermal conductivity, A3000-series alloy, which exhibits a good balance among corrosion resistance, thermal conductivity, and strength, or the like can be used as the aluminum material that constitutes the substrate.

In a situation in which the aluminum composite material is to be used in a component of a vehicle such as a train, A6000-series alloy, which excels in extrudability, A7000-series alloy, which is advantageous for its high strength and for weight reduction, or the like can be used. In a situation in which the aluminum composite material is to be used in a component of a ship or the like, A5000-series alloy, which excels in ductility and corrosion resistance, or the like can be used. In a situation in which the aluminum composite material is to be used in the component of an aircraft or the like, A2000-series alloy, A7000-series alloy, and the like, which have high strength, can be used.

The substrate may have an undercoating on its surface. By forming the primer coating on the undercoating, adhesion between the substrate and the primer coating can be further increased. As a result, the adhesive strength between the substrate and the resin member of the aluminum-alloy composite material can be further increased.

For example, a reactive-type coating, such as a phosphoric-chromate coating, a titanium-based coating, and a zirconium-based coating; a deposition-type coating composed of a coating film that contains a metal compound, such as a chromium compound, a titanium compound, or a zirconium compound, and a binder, which holds the compound on the substrate; a porous anodized coating that is formed by electrolysis in a phosphoric-acid bath, a sulfuric-acid bath, or an alkaline bath; a boehmite coating; or the like can be used as the undercoating.

The undercoating is preferably a phosphoric-chromate coating or a porous anodized coating. Phosphoric-chromate coatings are low cost, which is required in processing, and excel in mass producibility and corrosion resistance. In addition, after the primer has been applied to the porous anodized coating, the primer tends to penetrate into the pores of the anodized coating. Consequently, owing to an anchoring effect, adhesion between the primer coating and the substrate can be further improved.

The primer coating is provided on the substrate. The primer coating may cover the entire surface of the substrate or may cover a portion of the substrate. From the viewpoint of reducing the amount of the primer used, it is preferable that the primer coating covers only a portion of the substrate.

The amount of the primer coating that is adhered is not particularly limited; however, in case the adhered amount is too small, then the resin of the primer will be introduced into the resin member, and thereby the amount of the resin in the primer coating existing between the substrate and the resin member will tend to become insufficient. As a result, there is a risk that it will lead to a decrease in adhesion with the substrate. In addition, in case the adhered amount is too large, the primer coating will tend to undergo cohesive failure when an external force has been applied, and there are situations in which that will lead to a decrease in the adhesive strength between the substrate and the resin member.

From the viewpoint of avoiding such problems, the amount of adhered primer coating is preferably 0.1-10 g/m$^2$, more preferably in the range of 1-7 g/m$^2$, and yet more preferably in the range of 2-5 g/m$^2$.

The primer coating contains a urethane resin. For example, a polymer compound obtained by a polyaddition reaction of a polyisocyanate with a polyol can be used as the urethane resin. For example, an aliphatic isocyanate, such as hexamethylene diisocyanate, isophorone diisocyanate, etc.; an aromatic isocyanate, such as toluene diisocyanate, diphenylmethane diisocyanate, etc.; or the like can be used as the polyisocyanate. These isocyanates may be used independently, or two or more may be used in combination.

The urethane resin preferably contains a structural unit derived from an aromatic isocyanate. In this case, adhesion between the primer coating and the substrate can be further increased, and adhesion between the primer coating and a resin, which is highly polar, can be further increased. For this reason, the adhesive strength between the substrate and the resin member of the aluminum-alloy composite material can be further increased.

For example, a polyol such as ethylene glycol, propylene glycol, glycerin, trimethylolpropane, pentaerythritol, etc.; a polyether polyol such as polyethylene glycol, polypropylene glycol, etc.; a polyester polyol composed of an ester of polycarboxylic acid and a polyol; a polycarbonate polyol made by bonding together, via a carbonate bond, structural units derived from polyols; or the like can be used as the polyol.

The urethane resin preferably contains a structural unit derived from a polyester polyol. That is, the urethane resin preferably is a polyester-based polyurethane. In this case, adhesion between the primer coating and the substrate can be further increased, and adhesion between the primer coating and a resin, which is highly polar, can be further increased. For this reason, the adhesive strength between the substrate and the resin member of the aluminum-alloy composite material can be further increased.

The primer coating has an infrared-absorption spectrum in which the value of the optical absorption $A_{C=O}$ at the peak top of the maximum peak among the peaks present in the wavenumber range of 1,180-1,330 $cm^{-1}$ is 0.8-1.5 times that of the optical absorption $A_{urethane}$ at the peak top of the maximum peak among the peaks present in the wavenumber range of 1,670-1,770 $cm^{-1}$. In the infrared-absorption spectrum of the primer coating that contains urethane resin, a peak originating from C=O stretching vibration of the urethane bond appears within the wavenumber range of 1,670-1,770 $cm^{-1}$. In addition, a peak originating from C=O stretching vibration of a carbonyl group appears within the wavenumber range of 1,180-1,330 $cm^{-1}$. Accordingly, it is presumed that the ratio $A_{C=O}/A_{urethane}$, which is the ratio of the value of the optical absorption $A_{C=O}$ to the value of the optical absorption $A_{urethane}$ described above, indicates the amount of carbonyl groups in the urethane resin.

Primer coatings, in which the value of the optical absorption $A_{C=O}$ is in the specific range, excel in both adhesion with the aluminum material that constitutes the substrate and adhesion with a resin, which is highly polar. For example, it is conceivable that the following reason is why the primer coating is highly adhesive. The carbonyl group (—C(=O)—) is polarized such that positive charge is shifted toward the carbon atom and negative charge is shifted toward the oxygen atom. Consequently, owing to electrostatic forces, hydrogen bonds, and the like, it is conceivable that carbonyl groups can improve adhesion with the resin member, which is highly polar. For this reason, by forming such a primer coating on the substrate, a precoated aluminum material that excels in adhesion with the resin member can be obtained.

From the viewpoint of further improving both adhesion between the primer coating and the substrate and adhesion between the primer coating and the resin member, the value of the optical absorption $A_{C=O}$ is preferably 1.0-1.5 times and is more preferably 1.1-1.3 times that of the optical absorption $A_{urethane}$.

In the infrared-absorption spectrum of the primer coating, the value of the optical absorption $A_{COC}$ at the peak top of the maximum peak among the peaks present in the wavenumber range of 990-1,150 $cm^{-1}$ is preferably 0.7-1.3 times that of the optical absorption $A_{urethane}$ described above. In this case, adhesion between the precoated aluminum material and the resin member can be further improved.

For example, it is conceivable that the following reason is why the primer coating is highly adhesive. In the infrared-absorption spectrum of a primer coating that contains urethane resin, a peak originating from C—O—C stretching vibration of the ether bond appears within the wavenumber range of 990-1,150 $cm^{-1}$. Accordingly, it is presumed that the ratio $A_{COC}/A_{urethane}$, which is the ratio of the value of the optical absorption $A_{COC}$ to the value of the optical absorption $A_{urethane}$ described above, indicates the amount of ether bonds in the urethane resin.

The same as with the carbonyl group, the ether bond (—C—O—C—) is polarized such that positive charge is shifted toward the carbon atoms and negative charge is shifted toward the oxygen atom. Consequently, owing to electrostatic forces, hydrogen bonds, and the like, it is conceivable that ether bonds can improve adhesion with the resin member, which is highly polar. For this reason, by forming such a primer coating on the substrate, adhesion between the precoated aluminum material and the resin member can be further improved.

From the viewpoint of further improving both adhesion between the primer coating and the substrate and adhesion between the primer coating and the resin member, the value of the optical absorption $A_{COC}$ is more preferably 0.9-1.0 times that of the optical absorption $A_{urethane}$.

In the infrared-absorption spectrum of the primer coating, the value of the optical absorption $A_{aromatic}$ at the peak top of the maximum peak among the peaks present in the wavenumber range of 660-760 $cm^{-1}$ is preferably 1.0-1.7 times and more preferably 1.2-1.5 times that of the optical absorption $A_{urethane}$ described above. In this case, adhesion between the precoated aluminum material and the resin member can be further improved.

The primer coating may contain urethane resin and a resin other than urethane resin. For example, acrylic resin, melamine resin, or the like can be used as the resin(s) other than urethane resin.

A resin obtained by polymerizing a monomer having a (meth)acryloyl group, such as methyl acrylate and methyl methacrylate, can be used as the acrylic resin. The acrylic resin preferably contains a structural unit that is derived from methyl methacrylate. In this case, adhesion between the primer coating and the substrate can be further increased, and adhesion between the primer coating and a resin, which is highly polar, can be further increased. For this reason, the adhesive strength between the substrate and the resin member of the aluminum-alloy composite material can be further increased.

The content of the acrylic resin in the primer coating is preferably set to 3-50 parts by mass to 100 parts by mass of the urethane resin. In this case, adhesion between the primer coating and the substrate can be further increased, and adhesion between the primer coating and a resin, which is highly polar, can be further increased. For this reason, the adhesive strength between the substrate and the resin member of the aluminum-alloy composite material can be further increased.

For example, methylated-melamine resin; etherified-melamine resin, in which some or all of the methylol groups in the methylated-melamine resin have been etherified by reacting with alcohol; or the like can be used as the melamine resin. A mixed etherified-melamine resin, in which some or all of the methylol groups in the methylated-melamine resin have been etherified by reacting with two or more types of alcohol, is preferably used as the melamine resin. In this case, adhesion between the primer coating and the substrate can be further increased, and adhesion between the primer coating and a resin, which is highly polar, can be further increased. For this reason, the adhesive strength between the substrate and the resin member of the aluminum-alloy composite material can be further increased.

The content of the melamine resin in the primer coating is preferably set to 0.3-13 parts by mass to 100 parts by mass of the urethane resin. In this case, adhesion between the primer coating and the substrate can be further increased, and adhesion between the primer coating and a resin, which is highly polar, can be further increased. For this reason, the adhesive strength between the substrate and the resin member of the aluminum-alloy composite material can be further increased.

The precoated aluminum material can be prepared by, for example, the method below. First, the substrate for forming the primer coating is prepared. For example, a rolled sheet, an extruded material, a forged material, or the like can be used as the substrate. In a situation in which a rolled sheet is used as the substrate, it is also possible to form a desired shape by performing pressing or the like on the rolled sheet in advance.

Next, the surface of the substrate is cleaned to eliminate machining oil, foreign matter, and the like that has adhered to the surface. In a situation in which an undercoating is provided on the surface of the substrate, a surface treatment in accordance with the type of undercoating should be performed after the cleaning of the substrate.

Subsequently, a primer is applied over a desired region of the substrate surface. For example, an aqueous-urethane emulsion, in which micelles of the urethane resin are dispersed in water, can be used as the primer. In a situation in which it is attempted to form, as the primer coating, a coating that contains urethane resin and another resin, such as acrylic resin and melamine resin, a liquid mixture, in which an emulsion containing the urethane resin and an emulsion containing the other resin are mixed, should be used as the primer. At this time, the mixing ratio between the urethane resin and the resin other than urethane resin in the primer coating can be controlled by adjusting the ratio of solid content in the liquid mixture.

After the primer coating has been applied to the substrate surface, the primer coating can be formed on the surface of the substrate by drying of the primer. When the primer is being dried, the primer may be heated as needed. The drying temperature and the drying time of the primer can be set as appropriate in accordance with the type of primer. For example, the drying temperature of the primer can be set as appropriate within the range of 150-300° C.

The drying temperature and the drying time of the primer are preferably set to a temperature and a time at which the mechanical characteristics of the substrate are not impaired. That is, in a situation in which, for example, an aluminum material that has undergone work hardening, a heat solution treatment, or thermal refining by quenching or the like in the manufacturing process is to be used as the substrate, there are situations in which the aluminum alloy will soften due to the heating during drying.

For example, in the case of A1100-H18, when heating is performed for 15 min at 260° C., the proof stress, which was approximately 150 MPa prior to heating, decreases to approximately 100 MPa. In addition, in the case of A5052-H18 alloy, when heating is performed for 10 min at 290° C., the proof stress, which was 300 MPa prior to heating, decreases to approximately 250 MPa. Such softening can be avoided by a method in which the temperature during drying is further lowered, the drying time is further shortened, or both the temperature is lowered and the time is shortened.

Precoated aluminum materials can be obtained as described above.

By bonding a resin member, which contains polybutylene terephthalate (PBT), polyamide (PA), polyphenylene sulfide (PPS), or an acrylonitrile-butadiene-styrene copolymer (ABS), to the primer coating of the precoated aluminum material, an aluminum composite material, in which the substrate and the resin member are bonded via the primer coating, can be obtained. The primer coating of the precoated aluminum material excels in adhesion with the resin described above. For this reason, according to the above-mentioned aluminum composite material, peeling of the resin member off of the substrate can be curtailed.

The method of bonding the substrate and the resin member is not particularly limited. For example, methods such as a hot-pressing method in which the resin member and the substrate that have been formed into a desired shape in advance are compression bonded together while being heated, an insert-molding method in which the resin member is insert molded onto the substrate, or the like can be used as the method of bonding the substrate and the resin member together.

Working Examples

Working examples of the precoated aluminum material will now be explained, with reference to FIG. 1 to FIG. 4. It is noted that specific aspects of the precoated aluminum material according to the present invention are not limited to the aspects of the working examples and can be modified as appropriate within a range that does not deviate from the gist of the present invention.

In the present example, sheet materials composed of JIS A5052-H34 and each having a thickness of 1.5 mm were used as the substrates. In addition, primers, in which a urethane-resin emulsion, an acrylic-resin emulsion, a melamine-resin emulsion, a polyolefin emulsion, and a polyamide emulsion were mixed together such that their solid-content ratios became the proportions listed in Table 1, were prepared as the primers.

The urethane resin of the present example contained a structural unit derived from a polyester polyol and a structural unit derived from an aromatic polyisocyanate. The acrylic resin of the present example contained a structural unit derived from methyl methacrylate. The melamine resin of the present example was a mixed etherified-melamine resin.

After the primers listed in Table 1 were applied to the substrates, the substrates were heated at a temperature of approximately 200° C. for 1 min, and thereby the primers were dried. Based on the above, as shown in FIG. 1, precoated aluminum materials 1 (Test Materials A1-A8), each comprising a substrate 2 and a primer coating 3 layered on the substrate 2 and having the compositions listed in Table 1, could be obtained.

Figure 2:
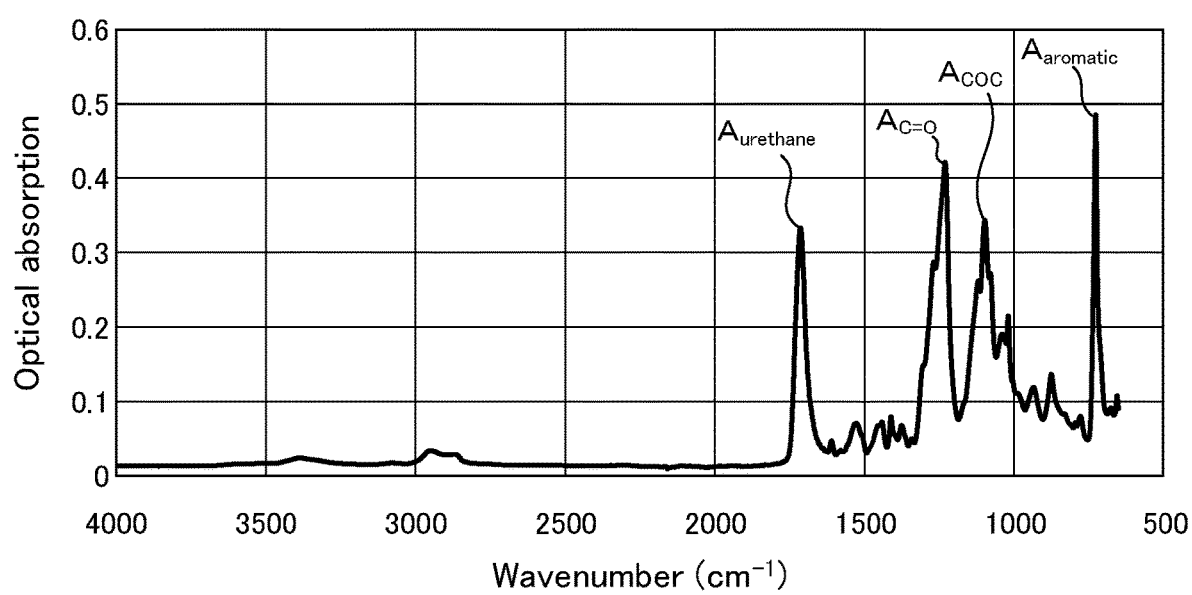
FIG. 2 is an explanatory diagram that shows the infrared-absorption spectrum of the primer coating of Test Material A1 according to the working example.
Figure 3:
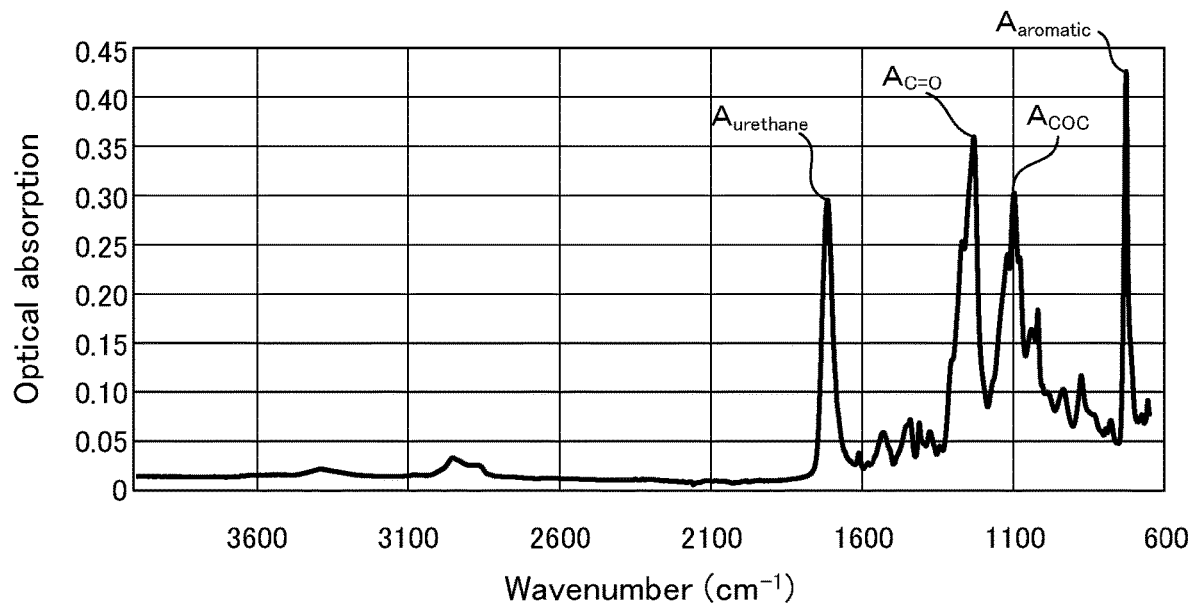
FIG. 3 is an explanatory diagram that shows the infrared-absorption spectrum of the primer coating of Test Material A2 according to the working example.
}

Infrared-absorption spectrums of the primer coatings 3 were obtained for Test Materials A1-A5, from among the Test Materials A1-A8, in which the primer coating contained urethane resin. FIG. 2 and FIG. 3 show, as examples of the infrared-absorption spectrums, the infrared-absorption spectrums of the primer coatings 3 in Test Material A1 and Test Material A2. The ordinate in FIG. 2 and FIG. 3 represents the optical absorption, and the abscissa represents the wavenumber ($cm^{-1}$). It was possible to measure the primer coatings 3 using, for example, a total-reflection measuring method in which the number of scans was 15.

The value of the optical absorption $A_{urethane}$ at the peak top of the maximum peak among the peaks present in the wavenumber range of 1,670-1,770 $cm^{-1}$, the value of the optical absorption $A_{C=O}$ at the peak top of the maximum peak among the peaks present in the wavenumber range of 1,180-1,330 $cm^{-1}$, the value of the optical absorption $A_{COC}$ at the peak top of the maximum peak among the peaks present in the wavenumber range of 990-1,150 $cm^1$, and the value of the optical absorption $A_{aromatic}$ at the peak top of the maximum peak among the peaks present in the wavenumber range of 660-760 $cm^{-1}$ were each calculated from the infrared-absorption spectrums obtained. Table 1 lists the values of the ratio $A_{C=O}/A_{urethane}$ of $A_{C=O}$ to $A_{urethane}$ calculated based on the infrared-absorption spectrums of Test Materials A1-A5, the values of the ratio $A_{COC}/A_{urethane}$ of $A_{COC}$ to $A_{urethane}$, and the values of the ratio $A_{aromatic}/A_{urethane}$ of $A_{aromatic}$ to $A_{urethane}$. It is noted that the symbol "-" in Test Materials A6-A8 indicates that an infrared-absorption spectrum was not obtained.

It was possible to evaluate the adhesion between the precoated aluminum materials and the resin members using a method compliant with ISO 19095. The method of evaluating the adhesion between the precoated aluminum material and the resin members was, specifically, as follows.

Figure 4:
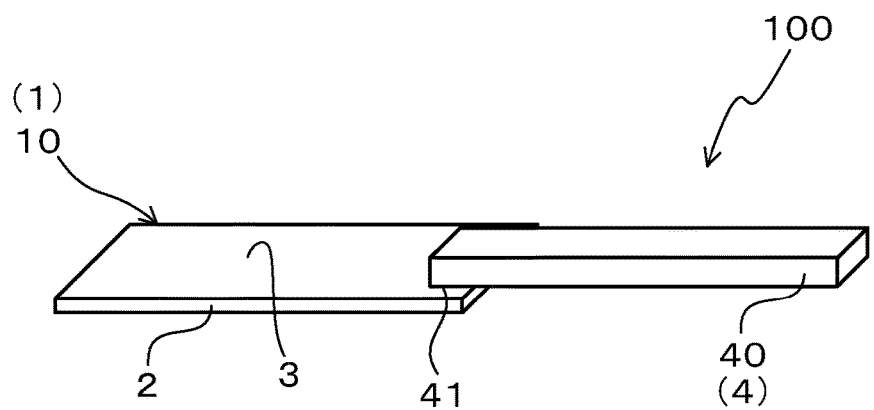
FIG. 4 is an oblique view of a test piece used in the evaluation of the shear strength of adhesive bonds according to the working example.

First, a small piece 10, which exhibited an oblong shape having a length of 45 mm and a width of 17 mm, was cut from the precoated aluminum material 1. Next, as shown in FIG. 4, a test piece 100 for evaluating the shear strength of adhesive bonds was prepared by forming a resin sheet 40, which served as a resin member 4 and contained a resin as listed in Table 1, on the primer coating 3 at one end of the small piece 10 in a longitudinal direction using injection molding. The length of the resin sheet 40 was set to 45 mm, the width was set to 10 mm, and the thickness was set to 3 mm. In addition, the length of an overlapping portion 41, at which the small piece 10 of the precoated aluminum material 1 and the resin sheet 40 overlap, was set to 5 mm.

Using the resulting test piece 100, a tensile-shear test was performed in accordance with the method stipulated in ISO 19095. The fracture strength obtained as a result thereof is listed in Table 1 as the shear strength of adhesive bonds between the precoated aluminum material 1 and the resin member 4 (that is, the resin sheet 40).

rial A7, which comprised a primer coating that was composed only of polyolefin, and Test Material A8, which comprised a primer coating that was composed only of polyamide, exhibited virtually no adhesion with respect to resin members that contained PBT.

The invention claimed is:

1. A precoated aluminum material, to which a resin member is bondable, comprising:
   a substrate composed of an aluminum material; and
   a primer coating formed on the substrate;
   wherein:
   the primer coating:
      contains 3-50 parts by mass of an acrylic resin to 100 parts by mass of a urethane resin and 0.3-13 parts by mass of a melamine resin to 100 parts by mass of the urethane resin; and
      has an infrared-absorption spectrum in which the value of the optical absorption $A_{C=O}$ at the peak top of the maximum peak among peaks present in the wavenumber range of 1,180-1,330 cm$^{-1}$ is 0.8-1.5 times that of the optical absorption $A_{urethane}$ at the peak top of the maximum peak among peaks present in the wavenumber range of 1,670-1,770 cm$^{-1}$.

TABLE 1

| Test Material Symbol | | | Test Material A1 | Test Material A2 | Test Material A3 | Test Material A4 | Test Material A5 | Test Material A6 | Test Material A7 | Test Material A8 |
|---|---|---|---|---|---|---|---|---|---|---|
| Primer coating | Urethane resin | parts by mass | 100 | 100 | 100 | 100 | 100 | — | — | — |
| | Acrylic resin | parts by mass | — | 20 | 20 | 20 | 20 | 100 | — | — |
| | Melamine resin | parts by mass | — | — | 1.1 | 1.1 | 1.1 | — | — | — |
| | Polyolefin | parts by mass | — | — | — | — | — | — | 100 | — |
| | Polyamide | parts by mass | — | — | — | — | — | — | — | 100 |
| | Adhered amount | g/m2 | 6 | 6 | 6 | 6 | 6 | 6 | 6 | 6 |
| Infrared absorption spectrum | $A_{C=O}/A_{urethane}$ | times | 1.3 | 1.2 | 1.1 | 1.1 | 1.1 | — | — | — |
| | $A_{COC}/A_{urethane}$ | times | 1.0 | 1.0 | 0.9 | 0.9 | 0.9 | — | — | — |
| | $A_{aromatic}/A_{urethane}$ | times | 1.5 | 1.4 | 1.2 | 1.2 | 1.2 | — | — | — |
| Resin member | | — | ABS | ABS | ABS | PBT | PPS | PBT | PBT | PBT |
| Shear strength of adhesive bonds | | MPa | 5 | 12 | 15 | 5 | 6 | 0 | 0 | 0 |

Test Materials A1-A5 contain urethane resin and, as shown in FIG. 2 and FIG. 3, comprise a primer coating that has an infrared-absorption spectrum in which the value of the ratio $A_{C=O}/A_{urethane}$ of the value of the optical absorption $A_{C=O}$ to the value of the optical absorption $A_{urethane}$ is within the specific range. Primer coatings 3 of this kind excel in both adhesion with a substrate 2 and adhesion with a resin member 4, which contains a resin such as PBT, PPS, or ABS.

From a comparison of Test Materials A1-A3, for which adhesion with respect to a resin member that contains ABS was evaluated, it could be understood that Test Material A2, which comprised the primer coating 3 that contained urethane resin and acrylic resin, had a higher shear strength of adhesive bonds than Test Material A1. In addition, it could be understood that Test Material A3, which comprised the primer coating 3 that contained urethane resin, acrylic resin, and melamine resin, had a higher shear strength of adhesive bonds than Test Material A1.

In contrast, Test Material A6, which comprised a primer coating that was composed only of acrylic resin, Test Mate- 2. The precoated aluminum material according to claim 1, wherein, in the infrared-absorption spectrum of the primer coating, the value of the optical absorption $A_{COC}$ at the peak top of the maximum peak among peaks present in the wavenumber range of 990-1,150 cm$^{-1}$ is 0.7-1.3 times that of the optical absorption $A_{urethane}$.

3. The precoated aluminum material according to claim 2, wherein, in the infrared-absorption spectrum of the primer coating, the value of the optical absorption $A_{aromatic}$ at the peak top of the maximum peak among peaks present in the wavenumber range of 660-760 cm$^{-1}$ is 1.0-1.7 times that of the optical absorption $A_{urethane}$.

4. The precoated aluminum material according to claim 3, wherein the urethane resin contains a structural unit derived from a polyester polyol.

5. The precoated aluminum material according to claim 4, wherein the urethane resin contains a structural unit derived from an aromatic polyisocyanate.

6. An aluminum composite material comprising:
   the precoated aluminum material according to claim 5; and a resin member bonded to the primer coating of the precoated aluminum material, the resin member comprising at least one polymer selected from the group consisting of polybutylene terephthalate, polyamide, polyphenylene sulfide, and acrylonitrile-butadiene-styrene copolymer.

7. The precoated aluminum material according to claim 1, wherein, in the infrared-absorption spectrum of the primer coating, the value of the optical absorption $A_{aromatic}$ at the peak top of the maximum peak among peaks present in the wavenumber range of 660-760 cm$^{-1}$ is 1.0-1.7 times that of the optical absorption $A_{urethane}$.

8. The precoated aluminum material according to claim 1, wherein the urethane resin contains a structural unit derived from a polyester polyol.

9. The precoated aluminum material according to claim 8, wherein the urethane resin contains a structural unit derived from an aromatic polyisocyanate.

10. The precoated aluminum material according to claim 1, wherein the urethane resin contains a structural unit derived from an aromatic polyisocyanate.

11. An aluminum composite material comprising:
the precoated aluminum material according to claim 1; and
a resin member, which contains one or two or more from among polybutylene terephthalate, polyamide, polyphenylene sulfide, and acrylonitrile-butadiene-styrene copolymer and is bonded to the primer coating of the precoated aluminum material.

12. A composition of matter, comprising:
a substrate composed of aluminum or an aluminum alloy; and
an adhesive primer coating bonded to the substrate and comprising 3-50 parts by mass of an acrylic resin per 100 parts by mass of a polyurethane and 0.3-13 parts by mass of a melamine resin per 100 parts by mass of the polyurethane;
wherein an infrared-absorption spectrum of the adhesive primer coating exhibits:
a maximal value of optical absorption $A_{C=O}$ in the wavenumber range of 1,180-1,330 cm$^{-1}$,
a maximal value of optical absorption $A_{urethane}$ in the wavenumber range of 1,670-1,770 cm$^{-1}$, and
the maximal value of optical absorption $A_{C=O}$ is 0.8-1.5 times the maximal value of optical absorption $A_{urethane}$.

13. The composition of matter according to claim 12, wherein the infrared-absorption spectrum of the adhesive primer coating further exhibits:
a maximal value of optical absorption $A_{COC}$ in the wavenumber range of 990-1,150 cm$^{-1}$,
a maximal value of optical absorption $A_{aromatic}$ in the wavenumber range of 660-760 cm$^{-1}$,
the maximal value of optical absorption $A_{COC}$ is 0.7-1.3 times the optical absorption $A_{urethane}$, and
the maximal value of optical absorption $A_{aromatic}$ is 1.0-1.7 times the optical absorption $A_{urethane}$.

14. The composition of matter according to claim 13, wherein the polyurethane is composed of alternating structural units derived from a polyester polyol and from an aromatic di-isocyanate.

15. An aluminum composite material comprising:
the composition of matter according to claim 12; and
a resin member bonded to the adhesive primer coating, the resin member comprising at least one polymer selected from the group consisting of polybutylene terephthalate, polyamide, polyphenylene sulfide, and acrylonitrile-butadiene-styrene copolymer.

* * * * *